2,560,287

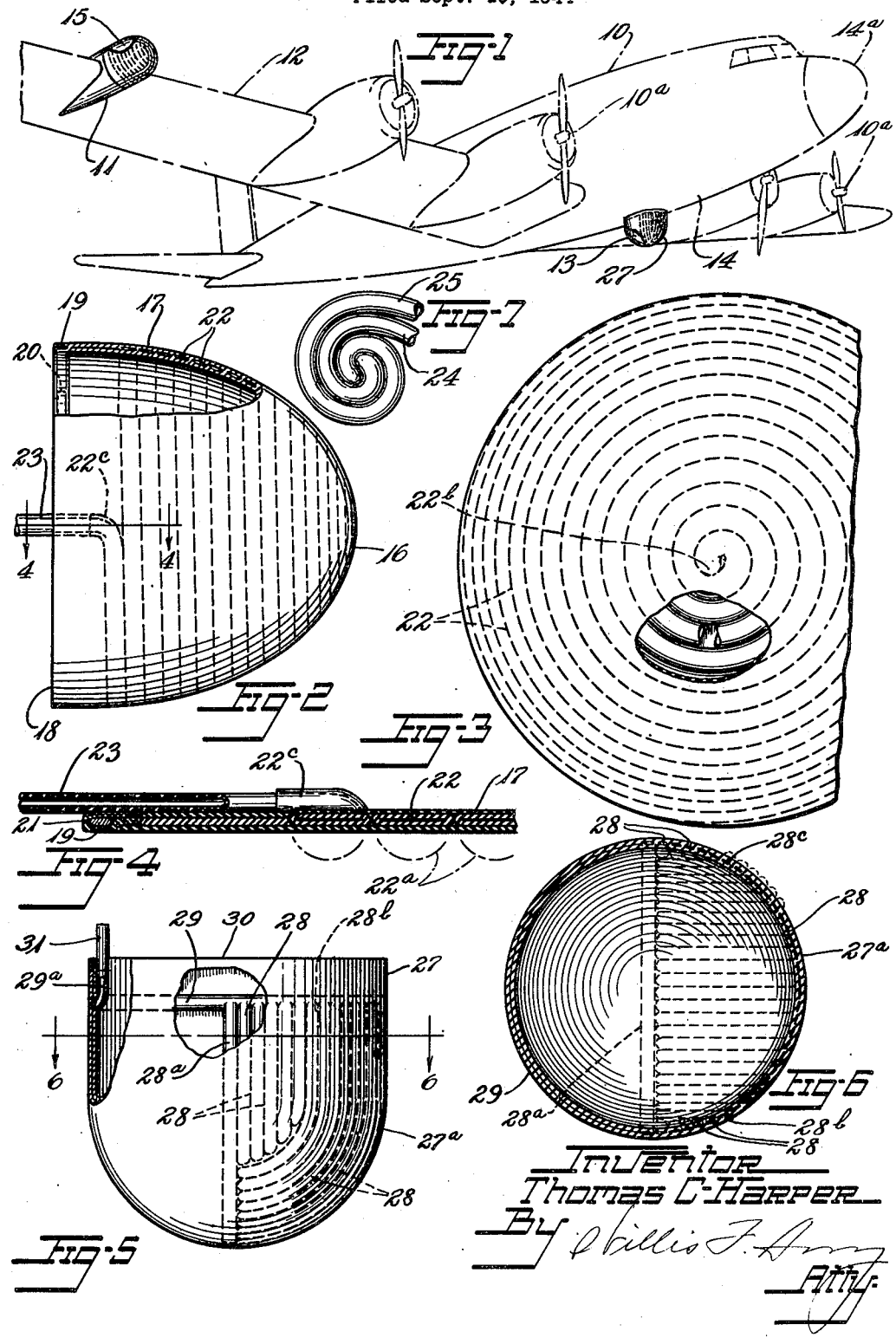
July 10, 1951     T. C. HARPER     2,560,287
PROTECTIVE COVERING TO PREVENT ICE ACCUMULATION
Filed Sept. 19, 1944
Inventor
Thomas C. Harper Patented July 10, 1951

UNITED STATES PATENT OFFICE 2,560,287

PROTECTIVE COVERING TO PREVENT ICE ACCUMULATIONS

Thomas C. Harper, Akron, Ohio, assignor to The B. F. Goodrich Company, New York, N. Y., a corporation of New York Application September 19, 1944, Serial No. 554,807

13 Claims. (Cl. 244—134)

This invention relates to protective coverings and especially to coverings for protecting structures from ice accumulation. The invention is useful especially for the protection of elements of aircraft from ice accumulation, including enclosures for electronic apparatus for radiant energy transmission or otherwise, housings for radio compass loops, fuselage nose pieces, propeller hub housings and spinners, elevator balances, wing floats and other streamline or generally dome-shaped structures and surfaces.

Objects of the invention are to provide apparatus including inflatable means for preventing effectively ice accumulation on an element of generally dome shape disposed in a flow of air under icing conditions; to provide continuity of inflated ridges over the surface despite the dome shape; to provide these results without objectionable increase in aerodynamic drag; and to provide simplicity of construction, convenience of manufacture, light weight, and effectiveness of operation.

Further and more specific objects are to provide for distending the exposed front surface of a covering for a generally dome-shaped element into a series of adjacent ridges substantially throughout the entire extent of such front surface; and to provide for distending such front surface of the covering into a series of adjacent, continuously annular, spiral ridges.

These and further objects and advantages will be apparent from the following description, references being had to the accompanying drawings, in which:

Fig. 1 is a perspective view of an airplane having elements thereof including protective coverings constructed according to and embodying the invention, Fig. 2 is a side view of a protective covering for a generally dome-shaped element disposed at the leading edge of a wing, parts being broken away and in section, Fig. 3 is a front view on an enlarged scale of the protective covering shown in Fig. 2, parts being broken away and in section, Fig. 4 is a sectional view on an enlarged scale taken along line 4—4 of Fig. 2, Fig. 5 is a view like Fig. 2 showing a modified construction of the covering suitable for such an element projecting from a fuselage, parts being broken away and in section, Fig. 6 is a sectional view taken along line 6—6 of Fig. 5, and Fig. 7 is a view like Fig. 3 showing a further modified construction of the covering, parts being broken away and in section.

The invention is useful for application on the exposed surfaces of many elements of an aircraft 10, which elements may include, for example, with reference to Fig. 1, an enclosure 11 suitable for housing electronic or other apparatus at the leading edge of a wing 12 of the aircraft, an enclosure 13 suitable for housing similar apparatus projecting from the lower side of a fuselage 14 of the aircraft, and other elements such as the nose 14a and the propeller hubs 10a, 10a of such aircraft disposed in the flow of air under icing conditions. The enclosure 11, desirably streamline in shape, includes a generally dome-shaped nose portion 15 having a continuous wall projecting forwardly with respect to the leading edge of the wing 12. The relatively smooth wall of the enclosure including the nose portion 15 may be of plastic material, aluminum alloy, magnesium alloy or other suitable rigid material capable of resisting substantial deformation under air pressure at high speeds of flight and having the desired electrical or other physical characteristics.

For preventing ice accumulation on the exposed front surface of the enclosure 11, the invention provides a protective apparatus or covering 16 including a body 17 of resilient rubber or other rubber-like material positionable on the relatively smooth surface of nose portions 15, which covering may extend continuously throughout the entire extent of such nose portion. The protective covering 16, which is desirably generally dome-shaped to conform smoothly to the contour of the nose portion 15, fits snugly and tightly on the wall of the nose portion 15 presenting a relatively smooth outer contour for maintaining aerodynamic air flow thereover. The covering may be attached along its rearward margin 18 to such wall at or rearwardly of the maximum width of the nose portion as by suitable screw fastener means, or a suitable adhesive such, for example, as rubber cement, or both in a manner to maintain the material of the covering 16 in a condition of slight stretch substantially throughout the extent of such covering for suction-gripping action with the nose portion 15 and for cooperating with the external air pressure on the covering whereby objectionable lifting of the covering from the wall of the nose portion is prevented despite variation in such air pressure on the covering.

To facilitate so mounting the covering, the attaching margin 18 may be suitably reinforced and preferably by a four-piece bead ring 19 of flat wire, for example, of steel disposed unadhered to and in the body 17 of rubber, each pair of adjacent ends of the bead ring being held slidingly by and positioned in spaced relation to one another within a joining sleeve 20 of steel embedded adheringly in such body of rubber. The margin may also be reinforced by a stretchable strip 21 of woven fabric of suitable material such, for example, as nylon, rayon, linen, cotton or other like material, the strip 21 being folded about the bead 19, as shown especially in Fig. 4. By virtue of such a marginal construction and the resiliency of the rubber material, the covering especially at the attaching margin 18 may be extended and contracted to conform smoothly to the surface of the nose portion without objectionable wrinkling and also to accommodate differences in size of such nose portion at the region of the margin 18 as well as permitting positioning the margin rearwardly of the maximum width of the nose portion.

The covering 16 for purposes of minimum weight and thickness consistent with strength requirements is preferably wholly of resilient rubber material except for the construction at the attaching margin 18. However, for additional strength purposes, if desired, one or more overlying layers (not shown) of reinforcing material embedded in the rubber body of the covering may be provided, such layer or layers being, for example, square-woven fabric of nylon, rayon, cotton or other suitable fibrous material coated or impregnated with suitable rubber material.

The invention provides an inflatable tube or tubes of suitable rubber material suitably disposed within the rubber body of the covering and constructed and arranged to distend the exposed surface of the covering into a plurality of adjacent ridges or ridged portions, desirably sharply-curved in cross-section, for breaking and removing the ice thereon. The inflatable tube or tubes may be relatively small, preferably about one inch or less in diameter, to provide the desired sharply-curved ridges, which sharp curvature facilitates prompt and thorough removal of relatively thin or thick ice deposits under the scavenging action of the air flow by virtue of breaking such ice into small pieces and also reducing the size of the adhered areas between such ice and the covering, hence reducing the adhesive force holding the pieces of ice on the latter. In the preferred construction, the walls of the tube or tubes are wholly of resilient rubber but for purposes of additional strength, may, if desired, be provided with a reinforcement of stretchable or non-stretchable woven fabric of suitable material embedded in the rubber walls thereof.

The covering 16 shown in Figs. 1 to 4, inclusive, includes an inflatable tube 22 embedded in the body of such covering and spirally wound about and along the longitudinal or fore and aft axis of the latter's dome-like form so that the tube extends generally both in the axial direction of the dome and in the circumferential direction thereof, the closed end at 22b of the tube 22 at the inner portion of the spiral being positioned at the apex of such form in the manner shown especially in Fig. 3, which apex is the region of the dome most remote from the base of the dome. The successive turns of the spirally wound tube 22 are disposed in close adjacency to one another, which turns extend continuously rearward directly from the apex of the dome-like covering to the rearward region of the covering at the attaching margin 18, as shown especially in Fig. 2, whereby, upon inflation of the tube 22, the exposed front surface of the covering 16 is distended outwardly into a succession of continuous, sharply-curved, spiral ridges 22a or ridged portions substantially throughout the entire extent of such front surface for effective ice removal therefrom.

The end portion 22c of the tube 22 adjacent the attaching margin 18 may be connected at the inner surface of the covering to a flexible conduit 23 in an air-tight manner as by rubber cement or other suitable means, as shown especially in Fig. 4, for connecting the tube to a source of air under pressure for inflating purposes, which source of air may be located within the wing 12 or the fuselage 14, for example, of the aircraft 10. The wall of the conduit 23 may be nylon fabric tubing having an impervious-to-air coating or impregnation of suitable rubber material.

The fabric and rubber parts of the covering 16 are united by vulcanization under heat and pressure.

In the operation of the covering, after it has been attached to the nose portion 15 of the enclosure 11 as described hereinabove, air under pressure is admitted in a cyclical manner through the conduit 23 to the spiral tube 22 which alternately inflates and deflates substantially uniformly throughout its extent. Each inflation of the tube 22 distends and stretches locally the exposed front surface of the covering 16 into a series of continuous, sharply-curved in section, spiral ridges 22a, as shown especially by broken lines in Fig. 4, in closely adjacent relation to one another, the longitudinal dimension of which ridges extends along the surface of the covering in the direction of the longitudinal or fore and aft axis of the dome-like nose portion 15, which distending and stretching action together with the sharp curvature of the small ridges breaks into pieces and loosens the ice deposited on such front surface thereby facilitating prompt and thorough removal of the pieces of ice by the scavenging action of the air flow. Although the succession of ridges or ridged portions makes possible effective ice removal from the covering, yet such ridges being relatively small as compared to the extent of the covering and being positioned in close adjacency to one another, cause minimum turbulency in the ambient airstream and provide these results without objectionable increase in the aerodynamic drag of the airplane during the inflated condition of the covering. Objectionable bulging or lifting of the covering 16 from the nose portion 15 of the enclosure 11 is prevented effectively by virtue of the small diameter and the arrangement of the tube and the suction-gripping action of the covering due to condition of slight stretch throughout the resilient rubber body of the covering cooperating with the outer air pressure in maintaining the covering in close conformance to the contour of the nose portion despite changes in such air pressure and the distention of the exposed front surface of the covering by inflation of the tube 22.

A further advantage of the spiral arrangement of the small tube 22 is that the inflation thereof distends the covering progressively from the base of the dome-shaped covering, where the air enters, toward the apex of the covering. The small tube having a fore and aft disposition of the covering distends in a smooth manner along its length by the movement of the inflating air toward the apex of the covering under the influence of the inflating air pressure as the latter builds up in the tube to full operating pressure thereby promoting peeling of the ice. Some ice is thus removed at the axially rearward region or base of the covering, even at less than full air pressure, and the effectiveness of ice-removal increases progressively along the tube as the air pressure builds up along the tube toward the apex of the covering. This progressive and smooth inflation of the tube promotes progressive peeling of the ice as well as progressive breaking of the same, which action is advantageous especially when the ice-deposit thickens increasingly toward the apex as is generally the case on forwardly projecting elements of aircraft.

In the modified construction shown in Fig. 7, two inflatable tubes 24 and 25 of suitable resilient rubber material are spirally arranged in side-by-side relation and closely adjacent one another throughout their extent in a generally dome-shaped covering which in other respects may be constructed and arranged like the covering 16. Each tube 24, 25 may be connected to the source of air under pressure in the manner described hereinabove for the tube 22 for inflating purposes. The inflatable tubes 24 and 25 may extend substantially throughout the entire extent of the covering. The parts of the covering are united by vulcanization under heat and pressure.

The tubes 24 and 25 may, if desired, be inflated in alternation with one another in a cyclical manner. Such inflation distends and stretches locally the exposed front surface of the covering into two, independent, spirally arranged, continuous ridges, which ridges are also sharply-curved in section and extend rearwardly directly from the front portion of the covering at the apex thereof to the rearward region at the attaching margin of the covering for effectively breaking the ice deposited thereon to effect the prompt and thorough removal of such ice substantially throughout the extent of the covering 26 by the scavenging action of the ambient airstream, even though such ice be relatively thin or thick.

The modified covering 27 shown in Figs. 5 and 6 is like the covering 16 in its materials and construction except as to the construction and arrangement of the inflatable tube or tubes 28. The covering 27 is applicable especially to an enclosure 13 or other structure exposed to the flow of air under icing conditions, which enclosure or structure extends across the direction of air flow and may project, for example, from the underside of the fuselage 14. The enclosure 13 may be of suitable material like that of the enclosure 11 to provide the desired relatively smooth outer surface and may be generally dome-shaped in form. Desirably, the covering 27 wholly encloses and protects that part of the enclosure 13 which is exposed to the outer airstream.

While a multiplicity of relatively small inflatable tubes 28 of suitable rubber material, each disposed in the direction of the longitudinal axis of the covering, may be provided throughout the entire extent of the dome-like covering 27, it is desirable from the standpoint of effectiveness of operation, light weight and simplicity of construction, that such tubes be disposed only in the rubber material of the front portion 27a of such covering; since it is essentially only the exposed surface of such portion that the outer airstream impinges against and hence only on such surface that the ice tends to deposit and accumulate. The tubes 28 are arranged in side-by-side and closely adjacent relation to one another.

In the arrangement of the inflatable tubes 28 in the distensible zone or front portion 27a, a manifold tube 29 of suitable rubber material is positioned adjacent the attaching margin 30 of the covering and extends circumferentially around and in the rubber body of such covering. An extension 29a of the manifold tube 29 projects from the rearward interior surface of the covering and is suitably connected, as described hereinabove for the conduit 23 and the tube 22, to a flexible conduit 31 of suitable material for conducting air under pressure to the inflatable tubes 28 from a suitable source located, for example, in the fuselage 14. An inflatable tube 28a extends axially and continuously along the rear margin of the front portion 27a, the two ends of the tube 28a being in communication with the manifold tube 29. Preferably, a series or succession of tubes 28 at the immediate leading edge region of the front portion are disposed in the direction of the longitudinal axis of the covering from the manifold tube 29 to the marginal tube 28a and extend continuously across such leading edge region in closely adjacent, side-by-side relation throughout their extent from the tube 28b to the tube 28c, each tube of such series being closed at its end at the tube 28a and being in communication with the manifold tube 29 at the other end thereof. A plurality of inflatable tubes 28 in communication with the manifold tube 29 are also disposed in similar side-by-side relation in the axial direction at each side of the front portion 27a to the rear of the immediate leading edge region thereof between the tubes 28b and 28c and the marginal tube 28a, each of which plurality of tubes terminates in closed ends at the tubes 28b and 28c, as shown especially in Fig. 5. Such a construction and arrangement provides a series of relatively small inflatable tubes extending in the direction of the longitudinal axis of the covering throughout the whole extent of the front portion 27a of the covering 27. The parts of the covering 27 are united by vulcanization under heat and pressure.

In the operation of the covering 27, after it is attached along its attaching margin to the enclosure 13 such that the rubber body of the covering is tightly fitting on the enclosure in a slightly stretched condition, air under pressure passes in a cyclical manner through the conduit 31 into the manifold tube 29 inflating the latter. The manifold tube 29 distributes the air under pressure uniformly to all the inflatable tubes 28, 28a, 28b and 28c in the front portion of the covering. The inflation of the latter tubes 28 distends and stretches the exposed surface of such front portion into relatively small, sharply-curved in section ridged portions, as shown by broken lines in Fig. 6, which ridged portions extend axially in side-by-side and closely adjacent relation throughout their extent and throughout the extent of the exposed front portion of the covering. Such ridged formation breaks and loosens effectively the ice deposited on the covering at the front portion 27a thereof for prompt and thorough removal therefrom by the scavenging action of the ambient airstream.

Variations may be made without departing from the scope of the invention as it is defined in the following claims.

I claim:

1. Apparatus for preventing ice accumulation on the front portion of a projecting element exposed to the flow of air under icing conditions, said apparatus comprising a covering for said front portion having a surface of elastic material and having an inflatable passage in the covering, said passage being disposed in a plurality of convolutions spirally toward the rear of said covering for distension of said surface by inflation of said passage progressively and continuously along the spiral.

2. Apparatus for preventing ice accumulation on a surface, said apparatus comprising a covering of resilient rubber-like material for said surface having an inflatable tubular passage therein spirally arranged in a plurality of convolutions from an intermediate region of said covering radially outward for distension of the covering by inflation of said passage progressively and continuously along the spiral.

3. Apparatus for preventing ice accumulation on a surface, said apparatus comprising a covering of resilient rubber-like material for said surface having a plurality of inflatable tubular passages therein spirally arranged in a plurality of convolutions from an intermediate region of said covering radially outwardly for distension of the covering by inflation of said passages progressively and continuously along the spiral.

4. Apparatus for preventing ice accumulation on a generally dome-shaped portion of a projecting element exposed to the flow of air under icing conditions, said apparatus comprising a generally dome-shaped covering of resilient rubber-like material for said portion having an inflatable tubular passage therein spirally arranged in a plurality of convolutions from the apex region of said dome-shaped covering radially outward and also toward the base thereof for distension of the latter by inflation of said passage progressively and continuously along the spiral, and means for thus inflating said passage.

5. Apparatus for preventing ice accumulation on a generally dome-shaped portion of a projecting element exposed to the flow of air under icing conditions, said apparatus comprising a generally dome-shaped covering of resilient rubber-like material for said portion having an inflatable tubular passage therein disposed spirally in a plurality of convolutions of progressively increasing distance radially outward from the apex region of said dome-shaped covering and progressively receding from said apex region to a position adjacent the base of said covering for distension of the latter by inflation of said passage progressively and continuously along the spiral, and means for thus inflating said passage.

6. Apparatus for preventing ice accumulation on a generally dome-shaped portion of a projecting element exposed to the flow of air under icing conditions, said apparatus comprising a generally dome-shaped covering of resilient rubber-like material for said portion having a pair of inflatable tubes therein disposed spirally in a plurality of convolutions of progressively increasing distance radially outward from the apex region of said dome-shaped covering and progressively receding from said apex region toward the base of said covering for distension of the latter by inflation of said pair of tubes progressively and continuously along the spiral, and means for thus inflating said pair of tubes.

7. Apparatus for preventing ice accumulation on a generally dome-shaped element projecting across the direction of flow of air under icing conditions, said apparatus comprising a generally dome-shaped covering of resilient rubber-like material for said element having an axis of symmetry through its base and apex, said covering including a side portion extending peripherally and axially of said covering which said portion is exposed to direct impinging action of said flow of air, a plurality of inflatable tubular passages in side-by-side closely adjacent relation to one another throughout their extent and disposed in said portion of said covering and extending in the direction of said axis of the covering from the region of said apex toward said base for distending the surface of said portion of the covering into ridged portions, and means for inflating said tubular passages.

8. Apparatus for preventing the accumulation of ice upon a projecting element exposed to the impinging action of flow of air under icing conditions, said apparatus comprising a dome-shaped covering extending peripherally about an axis perpendicular to the surface of the covering at its apex for complete peripheral and extensive axial coverage of said element, said covering comprising a surface of elastic material for exposure to the impinging action of the airflow, inflatable passage means beneath the elastic surface including at least one elongated tubular passage extending in its long dimension continuously in the covering from a position therein at the region of said apex along said covering outwardly and axially away from said apex by virtue of the dome shape of the covering to a position in said covering remote from said apex and spaced from said axis, and means for introducing inflating medium in said passage at the remote position for movement of the inflating medium progressively along said passage toward said apex to effect a corresponding progressive distension of said elastic surface along said passage in the direction toward said apex.

9. Apparatus as defined in claim 8 in which said elongated tubular passage is disposed in a plurality of convolutions from said remote position in the covering spirally toward said apex and said axis of the covering for effecting progressive distension of said elastic surface along the spiral passage in the direction toward said apex by virtue of movement of the inflating medium progressively along said passage in said direction.

10. Apparatus as defined in claim 8 in which said elongated tubular passage extends in the direction along said axis from a position in said covering remote from said apex and spaced from and at one side of the axis to said apex and then returns to a corresponding remote position in said covering spaced from and at the opposite side of the axis, and in which said inflatable passage means includes a plurality of tubular passages extending in the direction along said axis in closely adjacent parallel relation one to another from a position in said covering remote from said apex and spaced from said axis to a position in the covering adjacent said elongated tubular passage at the region of said apex and said plurality of passages each having a closed end at the region of said apex.

11. Apparatus for preventing the accumulation of ice upon a projecting element exposed to the impinging action of flow of air under icing conditions, said apparatus comprising a dome-shaped covering extending peripherally about an axis perpendicular to the surface of the covering at its apex for complete peripheral and extensive axial coverage of said element, said covering comprising a surface of resilient rubber material for exposure to the impinging action of the airflow, inflatable passage means beneath the resilient surface including at least one elongated tubular passage extending in its long dimension continuously in the covering from a position therein at said apex along said covering outwardly and axially away from said apex by virtue of the dome shape of the covering to a position in said covering remote from said apex and spaced from said axis, said tubular passage having a closed end at said apex of the covering, and means for introducing inflating medium in said passage at the remote position for movement of the inflating medium progressively along said passage toward its closed end at said apex to effect a corresponding progressive distension of said resilient surface along said passage in the direction toward said apex.

12. Apparatus for preventing the accumulation of ice upon a projecting element exposed to the impinging action of flow of air under icing conditions, said apparatus comprising a dome-shaped covering extending peripherally about an axis perpendicular to the surface of the covering at its apex for complete peripheral and extensive axial coverage of said element, said covering comprising a surface of resilient rubber material for exposure to the impinging action of the airflow, inflatable passage means beneath the resilient surface including at least a pair of elongated tubular passages in side-by-side relation each extending in its long dimension continuously in the covering from a position therein at the region of said apex along said covering outwardly and axially away from said apex by virtue of the dome shape of the covering to a position in said covering remote from said apex and spaced from said axis and each tubular passage having a closed end at said apex of the covering, and means for introducing inflating medium in said passages at the remote position for movement of the inflating medium progressively along said passages toward said apex to effect a corresponding progressive distension of said resilient surface along said passages in the direction toward said apex.

13. Apparatus for preventing the accumulation of ice upon a dome-shaped projecting element exposed to the impinging action of flow of air under icing conditions, said apparatus comprising a dome-shaped covering extending peripherally about an axis perpendicular to the surface of the covering at its apex for complete peripheral and extensive axial coverage of said element, said covering comprising a stretchable attaching margin extending peripherally of the covering at a position therein remote from said apex and said covering comprising resilient rubber material presenting a surface extending axially away from said apex to said attaching margin for exposure to the impinging action of the airflow, said attaching margin having therein a peripherally expansible-contractible reinforcing member for attaching the covering in a taut condition to said element to facilitate a resilient gripping action of the attached dome-shaped covering with said element so as to resist lifting of the covering from said element, said covering comprising inflatable passage means beneath the resilient surface including at least one elongated tubular passage extending in its long dimension continuously in the covering from a position therein at said apex along said covering outwardly and axially away from said apex by virtue of the dome shape of the covering to a position in said covering adjacent said attaching margin and spaced from said axis, and means for introducing inflating medium in said passage at the position adjacent said attaching margin for movement of the inflating medium progressively along said passage toward said apex to effect a corresponding progressive distension of said resilient surface along said passage in the direction toward said apex.

THOMAS C. HARPER.

REFERENCES CITED

The following references are of record in the file of this patent:

UNITED STATES PATENTS

| Number | Name | Date |
| --- | --- | --- |
| 2,168,012 | Waner | Aug. 1, 1939 |
| 2,327,034 | Geer | Aug. 17, 1943 |
| 2,342,979 | Spicer | Feb. 29, 1944 |
| 2,343,918 | McCoy | Mar. 14, 1944 |
| 2,378,528 | Arsandaux | June 19, 1945 |
| 2,436,889 | Heston | Mar. 2, 1948 |